United States Patent [19]

Priegnitz

[11] Patent Number: 5,565,104
[45] Date of Patent: Oct. 15, 1996

[54] SMALL SCALE SIMULATED MOVING BED SEPARATION PROCESS

[75] Inventor: James W. Priegnitz, Elgin, Ill.

[73] Assignee: UOP, Des Plaines, Ill.

[21] Appl. No.: 562,775

[22] Filed: Nov. 27, 1995

Related U.S. Application Data

[62] Division of Ser. No. 223,785, Apr. 6, 1994, Pat. No. 5,470, 464.

[51] Int. Cl.[6] ................................................ B01D 15/08
[52] U.S. Cl. .................................. 210/659; 210/198.2
[58] Field of Search ................................ 210/635, 656, 210/659, 662, 198.2; 127/46.1, 46.2

[56] References Cited

U.S. PATENT DOCUMENTS

| | | | |
|---|---|---|---|
| 3,268,605 | 8/1966 | Boyd | 260/666 |
| 3,706,812 | 12/1972 | DeRosset et al. | 260/674 SA |
| 4,379,751 | 4/1983 | Toritomi | 210/659 |
| 4,402,932 | 9/1983 | Gerhold | 210/659 |
| 4,498,991 | 2/1985 | Oroskar | 210/659 |
| 4,923,616 | 5/1990 | Hirata et al. | 210/676 |
| 4,970,002 | 11/1990 | Ando | 210/659 |
| 4,990,259 | 2/1991 | Kearney | 210/659 |
| 5,064,539 | 11/1991 | Tanimura | 210/659 |
| 5,093,004 | 3/1992 | Hotier | 210/198.2 |
| 5,102,553 | 4/1992 | Kearney | 210/198.2 |
| 5,122,275 | 6/1992 | Rasche | 210/198.2 |
| 5,126,055 | 6/1992 | Yamashita et al. | 210/659 |
| 5,156,736 | 10/1992 | Schoenrock | 210/659 |
| 5,223,143 | 6/1993 | Masuda | 210/659 |
| 5,456,825 | 10/1995 | Negawa et al. | 210/98 |

FOREIGN PATENT DOCUMENTS

| | | | |
|---|---|---|---|
| 0577079 | 6/1993 | European Pat. Off. | 210/198.2 |
| WO9216274 | 10/1992 | WIPO | 210/198.2 |

OTHER PUBLICATIONS

Storti, Guiseppe and Mazzotti, et al. "Performance of a Six–Port Simulated Moving–Bed Pilot Plant for Vapor Phase Adsorption Separations," *Separation Science And Technology*, 27 (14), pp. 1889–1916, 1992.

deRosset et al. "Liquid Column Chromatography as a Predictive Tool for Continuous Countercurrent Adsorptive Separations," *Ind. Eng. Chem., Process Des. Dev.*, vol. 15, No. 2, 1976, pp. 261–266.

*Primary Examiner*—Ernest G. Therkorn
*Attorney, Agent, or Firm*—Thomas K. McBride; John F. Spears, Jr.

[57] ABSTRACT

Various chemicals such as pharmaceuticals and petrochemicals are chromatographically separated in pilot plant quantities using an apparatus comprising a number of chambers containing an adsorbent linked together with valving necessary to simulate the continuous countercurrent flow of the adsorbent and liquid phases. The apparatus preferably comprises five multiport rotary valves, each having at least one port for each column. The fifth rotary valve provides a serial interconnection between the columns and also ensures the desired unidirectional flow of fluid in the apparatus.

4 Claims, 5 Drawing Sheets

SMALL SCALE SIMULATED MOVING BED SEPARATION PROCESS

CROSS REFERENCE TO RELATED APPLICATION

This application is a Division of my prior application Ser. No. 08/223,785 filed on Apr. 6, 1994 and now issued as U.S. Pat. No. 5,470,464.

FIELD OF THE INVENTION

The invention broadly relates to chromatographic apparatus used in the separation of chemicals such as hydrocarbons or pharmaceuticals. The invention more specifically relates to a novel apparatus and novel method of operation of an adsorptive separation process in which the movement of the adsorbent is simulated. In a limited embodiment the invention relates to the construction and operation of small scale adsorptive separation pilot plants.

RELATED ART

U.S. Pat. No. 3,706,812 issued to A. J. De Rosset and R. W. Neuzil describes a pilot plant scale simulated moving bed adsorptive separation process unit. This reference also describes an operational problem of such units when they are built in the manner of larger units and include a "pump around" pump used to maintain liquid circulation in the process. The invention described in this reference is the utilization of a check valve at outlet end of each adsorbent bed to maintain unidirectional flow.

In an article appearing at page 261 of *Industrial and Engineering Chemistry, Process Design and Development*, Vol. 15, No. 2 (1976), a further description of this type of pilot plant is provided. This article also gives examples of the usage of the system and the chemical component profiles which are generated in the plant.

In an article appearing at pages 1889–1916 of *Separation Science and Technology*, Vol 27, No. 14, (1992), there is illustrated the construction of a six- and twelve-bed simulated moving bed pilot plant using a number of multiport valves instead of a single rotary valve. One valve is used for each of the inlet and outlet streams, including a desorbent effluent stream.

U.S. Pat. No. 5,456,825 issued to M. Negawa et al discloses a system for controlling the flow in a small scale simulated moving bed separation apparatus. This apparatus or system comprises a circulations pump which is believed equivalent to the "pump-around pump" which the subject application seeks to eliminate. The apparatus of this patent also preferably comprises check valves, which are not employed in the subject process.

BRIEF SUMMARY OF THE INVENTION

The invention is a method of operating a simulated moving bed adsorptive separation process which eliminates the need for a "pump around" system used to circulate fluids in the overall process. The subject invention instead utilizes a valving system which blocks the flow of liquid through the process at the upstream end of the bed receiving the desorbent stream. In one limited embodiment of the invention, the desorbent material contained in the next bed upstream of the point of desorbent injection is discharged from the bed at a controlled rate and at least partially recycled as desorbent.

One broad embodiment of the invention may be characterized as an apparatus for performing a continuous high pressure liquid chromatographic separation which comprises a plurality of adsorbent chambers, with each chamber having an inlet and an outlet and being loaded with a quantity of a solid adsorbent; a first rotary valve means being connected via a first set of conduits to the inlet and outlet of each adsorbent chamber, with the first rotary valve means providing a set serial interconnection of the plurality of adsorbent chambers and also providing a means to prevent the flow of fluid, preferably liquid, through the conduits linking the first rotary valve to two selected sequential adsorbent chambers comprising a blockage within the first rotary valve means; second and third rotary valve means which are connected via a second set of conduits to the inlet of the adsorbent chambers; fourth and fifth rotary valve means which are connected via a third set of conduits to the outlet of the adsorbent chambers; flow control devices adapted to regulate the rate of flow of fluid through the second, third, and fourth rotary valves; fluid storage devices for a feed mixture and a desorbent compound operatively connected to the second and third rotary valve means for charging a feed stream and a desorbent stream to different adsorbent chambers via said second set of conduits; and fluid storage devices for an extract stream and a raffinate stream operatively connected to the fourth and fifth rotary valve means for collecting an extract steam and a raffinate stream delivered to said fourth and fifth rotary valve means via said third set of conduits. The second set of conduits connect only to the inlet of the chambers while the third set of conduits connects to the opposite (outlet) end of the chambers.

DETAILED DESCRIPTION AND PREFERRED EMBODIMENTS

Figure 1:
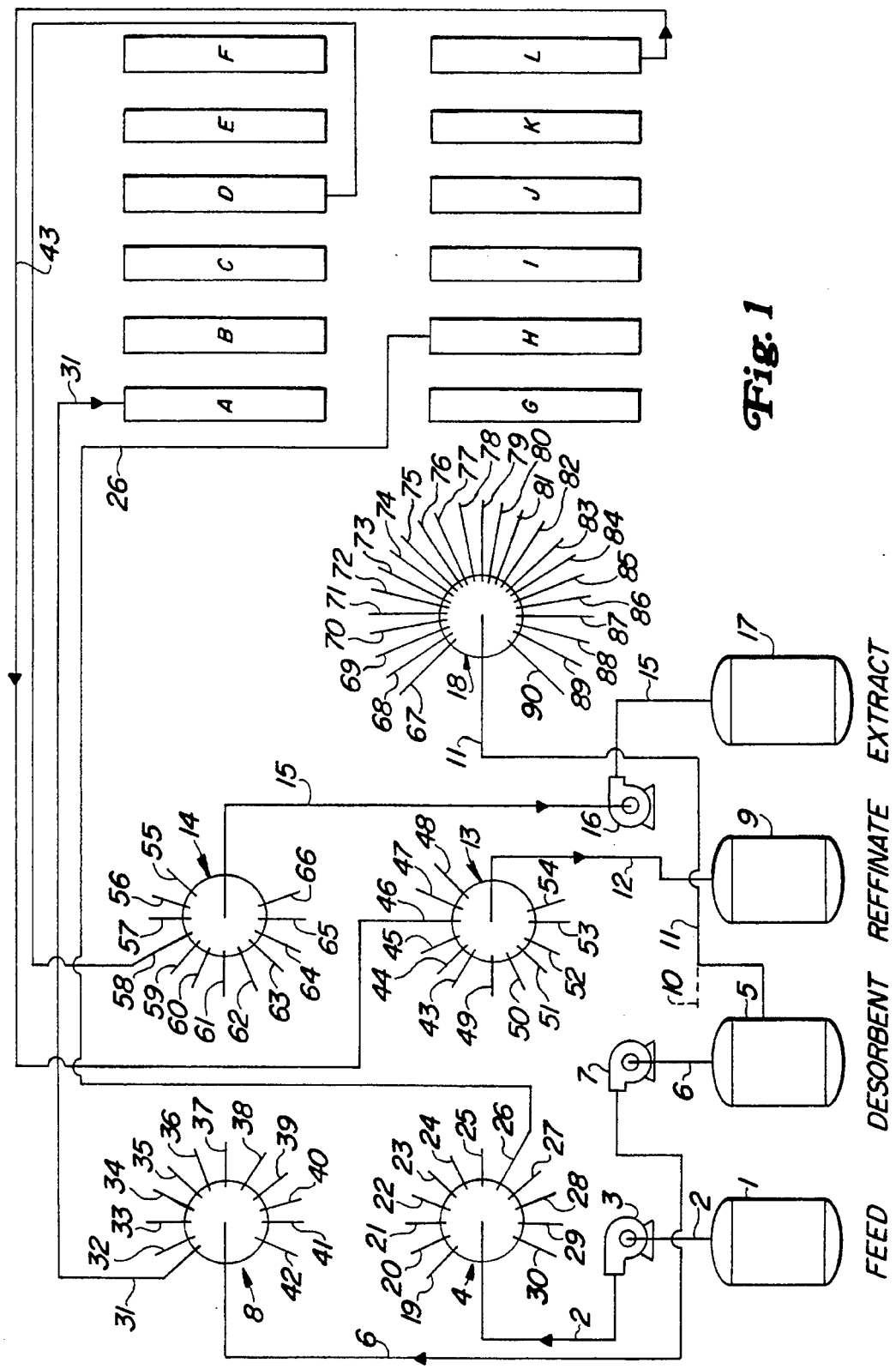
FIG. 1 is a flow diagram of a pilot plant scale apparatus built according to the subject invention for the adsorptive separation of hydrocarbons through the use of simulated countercurrent liquid-adsorbent flow.

Adsorptive separation is widely used in a number of industries to perform useful separations of a wide variety of chemicals including petrochemical intermediates. Simulated moving bed adsorptive separation is a mode of performing adsorptive separation which is employed when it is desired to obtain the benefits of a continuous process and other operational benefits. It is widely used in separating isomers as in the recovery of para xylene for polyesters and in the recovery of normal paraffins in the production of linear olefins which are then consumed in the production of detergents. It has also been described as useful or appropriate for the separation of chiral compounds and for sugars (U.S. Pat. No. 4,516,566). Ongoing efforts are being made to improve these current processes. In addition adsorptive separation is being investigated as a tool in many new separations of a wide variety of chemicals including chiral compounds and intermediates used in the production of experimental and therapeutic drugs. These efforts are normally conducted in small scale pilot plants which do not require much feed stock, adsorbent or plant space. This is especially true when the materials which are to be separated are expensive due to their rarity or complicated production techniques.

Pilot plant scale simulated moving bed adsorptive separation units are troubled by the fluid mixing and connecting line volume associated with the use of a pump referred to in the art as a "pump around" pump. One of the primary problems is that the mixing inherent in the pump and this volume destroys the sharp component concentration profiles which the adsorbent creates and which is necessary to perform the desired separation. The inventory of process liquid in connecting lines and in the pump becomes a larger fraction of the total volume of the adsorption apparatus as the size of the plant decreases. The mixing problem therefore increases as the size of the plant decreases. It is an objective of this invention to provide a small scale pilot plant system for which does not require a pump around pump.

This problem is discussed in some detail and a solution utilizing check valves at the inlet of each adsorbent bed is presented in previously cited U.S. Pat. No. 3,706,812. This solution, however, was aimed at relatively low pressure units. When a pilot plant employs a small particle size adsorbent, that is one less than 50 microns in average diameter, then the pressure drop and operating pressure in the unit increases substantially. Whereas the pressure drop (desorbent inlet to raffinate outlet) in the system may be in the order of 20–30 psi in a large scale pilot plant, the pressure drop in a pilot plant using high pressure liquid chromatography (HPLC) techniques may be up 1,500 psi or more. This high pressure differential makes utilization of the solution presented in the just cited reference impractical. It is therefore a specific objective of the subject invention to provide a high pressure pilot plant scale simulated moving bed adsorptive separation process which does not require a "pump around" pump. It is a further objective of the invention to provide an adsorptive separation process which requires a reduced amount of desorbent material.

The subject invention achieves these objectives by the use of a unique flow scheme that utilizes five separate rotary valves and a novel conduit arrangement to simulate continuous countercurrent flow of the adsorbent and process streams. In this process technique, the normal chromatographic profiles which develop as a multicomponent feed mixture passes through a lengthy bed of adsorbent is in effect frozen in place by the periodic change in the location of the addition and withdrawal points of the feed, desorbent, extract and raffinate streams. A shift of the feed and withdrawal points in the direction of fluid flow simulates movement of solids in the opposite direction. The lengthy bed of adsorbent is normally divided into a plurality of subbeds located between these feed and withdrawal points.

The overall process flow of the subject invention can be best described by reference to the Drawing. FIG. 1 is a simplified flow diagram of an embodiment of the invention employing twelve adsorbent beds or modules labeled A through L. FIG. 1 illustrates the basic arrangement of this embodiment which employs a total of five rotary valves labeled 4, 8, 13, 14 and 18. Rotary valve 4 is used to direct the flow of the feed admixture taken from storage tank 1 via line 2 and pressurized in a pump 3. Rotary valve 4 directs the flow of the feedstream into one of the twelve lines labeled 19 through 30 which connect to an upper end of the adsorbent beds or chambers A through L. As the embodiment shown in the Drawing employs a large number of lines, only those lines which are carrying the major process streams to and from the adsorbent chambers are shown in the Drawing. In this instance, line 26 conducts the feedstream to the upper end of adsorbent bed H.

Figure 4:
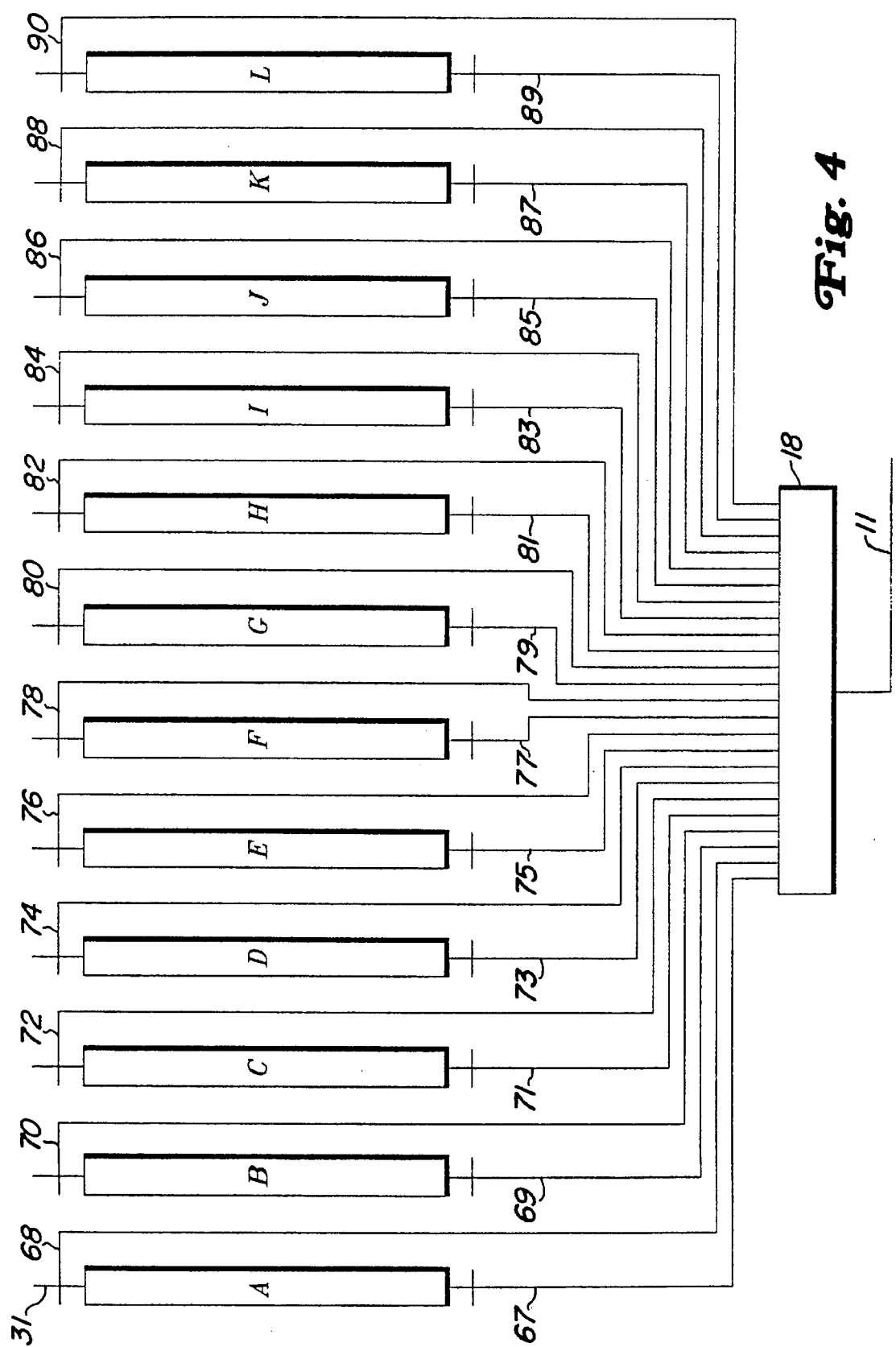
FIG. 4 illustrates the connection of rotary valve 18 to both the inlet and outlet of each of the adsorbent chambers A–L.

The beds are interconnected through the rotary valve 18 in a manner described in more detail below. At the point in time depicted in FIG. 1, the feedstream entering bed H through line 26 will cause a displacement of the liquid in the bed which will flow out of the bottom end of bed H through a line not shown in the Drawing. Reference to FIG. 4 will indicate that bed H is connected to valve 18 via line 81 which will carry the effluent of bed H to valve 18 which transfers the flow into line 84 which connects to the upper end of bed I. In this way different fluid flows pass through the zones maintained in the serially interconnected adsorbent beds A–L. In the specific embodiment illustrated in the Drawing, the flow of the feedstream into bed H causes fluid flow through beds H, I, J, K and L. The flow is in each instance routed through the rotary valve 18. The effluent of adsorbent bed L is removed through line 43 and conducted to the rotary valve 13. The fluid removed from the bottom of adsorbent bed L is the raffinate stream of the process, and is transferred by valve 13 into line 12 from which it flows into the raffinate storage tank 9.

While the above described events are occurring, a stream of desorbent withdrawn from the desorbent storage tank 5 travels through line 6 due to the action of a pump 7 and is delivered to the rotary valve 8. This entire stream of desorbent is transferred by the rotary valve 8 into line 31 which carries it to the top of the adsorbent chamber or bed A. The passage of the desorbent into the top of bed A will cause a displacement of the liquid in bed A and the passage of liquid out of the bottom of bed A through line 67 (refer to FIG. 4). This liquid flows out of valve 18 via line 68 which directs it to the top of bed B. This in turn displaces liquid out of the bottom of bed B which flows through line 69 to valve 18, and is returned to the top of adsorbent bed C via line 70. In a like manner, liquid travels from chamber C to chamber D. The separation which occurs while the fluid passes through the adsorbent retained in chambers A, B, C and D results in the formation of an extract stream having a high concentration of one component originally present in the feedstream withdrawn from tank 1. This component will be the component which is more strongly held by the adsorbent. Often, but not necessarily, the most strongly adsorbed component is the desired product. There is thereby formed an extract stream comprising this more strongly held component and the desorbent material which is withdrawn from the bottom of adsorbent chamber D through line 58 and delivered to rotary valve 14. Rotary valve 14 directs the flow of the desorbent material into line 15 through which it flows to a metering pump 16 and then into an extract collection tank 17. The metering pump 16 serves as the flow control device which regulates the rate of flow of the extract stream out of the process.

While this description of the figures is presented on the basis of all the flows through the adsorbent beds being in a downward direction, there is no inherent requirement for this to be so. The flow through the adsorbent beds may be in an upward direction or in a combination of upward and downward directions in different beds.

There is no direct control on the rate of flow of the raffinate stream. The flow rate of this stream is set by the rate of flow of the two streams into the process, namely, the feed and desorbent streams and the controlled rate of flow of the extract stream which leaves the process.

The subject apparatus employs two different rotary valve configurations. It employs four rotary valves having one line for each adsorbent bed. It also employs one rotary valve having two lines or conduits for each adsorbent bed. The four single conduit rotary valves control the point at which one of the primary flow streams (feed, desorbent, raffinate and extract) are passed into or withdrawn from one of the adsorbent beds. Each of these four valves will have one line attached to each of the adsorbent beds employed in a particular embodiment. In addition they have one main feed or withdrawal line connecting to the liquid storage device. The other rotary valve has two ports for each adsorbent bed with one line from each port being connected to the top (inlet) end and one line being connected to the bottom (outlet) end of each adsorbent bed. The dual port rotary valve 18 therefore provides a means to serially interconnect the adsorbent beds and allow the flow of liquid from one bed to another. All of the ports of the rotary valve 18 will be open to fluid flow at any time during the use of the apparatus except for one port which is blocked. The location of this one blocked port is stepped through the adsorbent beds in a coordinated manner with the stepping of the other rotary valves in a manner which maintains unidirectional flow through the apparatus. This blockage of one line through the indexing of the valve 18 eliminates the need for the check valve in each chamber A–L to provide unidirectional flow.

As described in more detail below there may be a small flow of the desorbent compound or mixture withdrawn from a "dead bed" chamber via optional line 11. This stream may then be recycled to the desorbent tank 5. A sample of the desorbent can be withdrawn through the optional sample tap 10.

Figure 2:
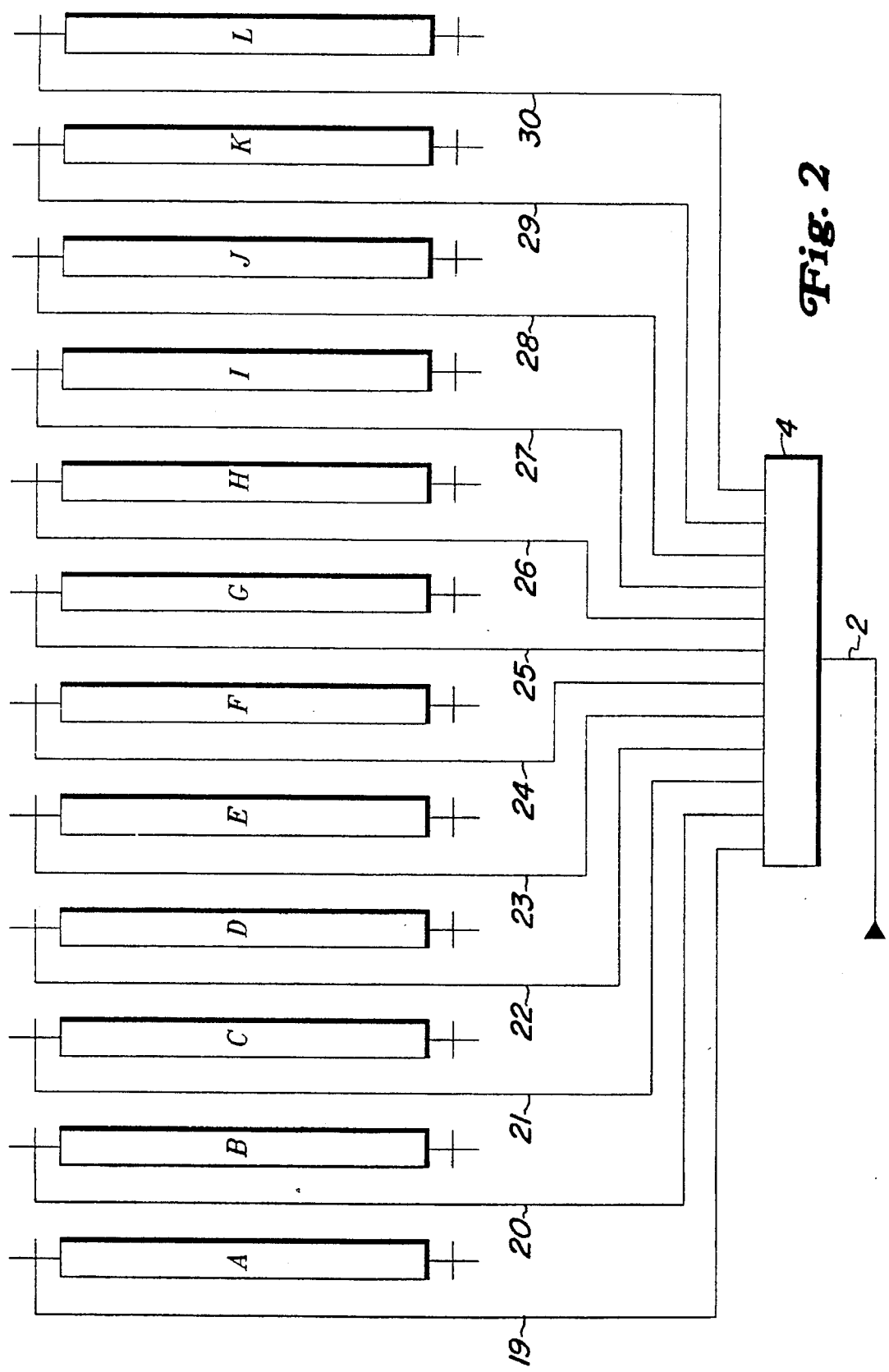
FIG. 2 illustrates the connection of rotary valve which directs desorbent flow, and the inlets of adsorbent chambers A–L.

FIG. 2 illustrates the interconnection for the rotary valve 4 which delivers the feedstream of line 2 to one of the adsorbent chambers A–L through one of lines 19 through 30. This Figure makes more apparent the fact that at the inlet and outlet of each of the adsorbent modules there is provided a T-shaped connector which allows the attachment of three conduits to each end of the adsorbent module. Each adsorbent chamber will therefore have connections at its upper end for attachment to a line carrying desorbent from valve 8 and the feedstream from valve 4 plus attachment to a line for the transfer of process fluid through the dual port rotary valve 18. In an analogous fashion, the lower end of each adsorbent module is configured for attachment to three conduits which are the conduits carrying the extract stream back to rotary valve 14, the raffinate stream back to rotary valve 13 and a line which connects to the dual port rotary valve 18. As the connections for valve 8 are essentially the mere image of those for valve 4, no separate Figure is provided showing the interconnection of valve 8 with the adsorbent chambers.

Figure 3:
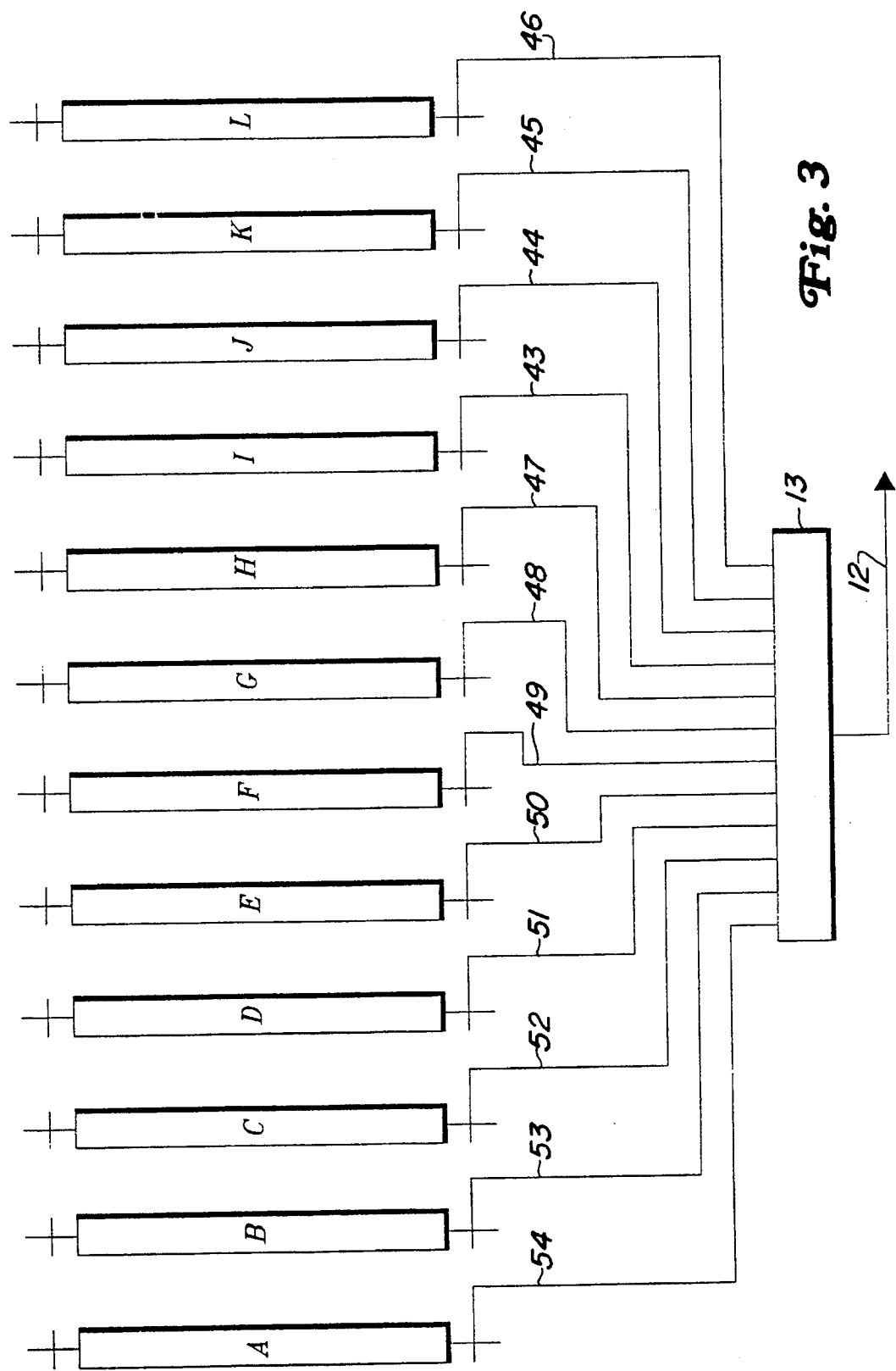
FIG. 3 illustrates the connection of rotary valve which handles the raffinate stream, to the outlets of adsorbent chambers A–L.

FIG. 3 is similar to FIG. 2 but shows the interconnections between the rotary valve 13 through which the raffinate is removed from the adsorption system with the individual adsorbent modules A–L. At any one point in time during the use of the apparatus, a raffinate stream is withdrawn through lines 43 through 54 and passed into the valve 13 which directs it into line 12.

FIG. 4 is presented to clarify the flow between the dual port rotary valve 18 and each of the adsorbent modules A through L. It illustrates the 24 conduits which are connected to the 12 adsorbent chambers of this particular embodiment, with one conduit being connected to each end of each adsorbent chamber to provide a serial interconnection between all of the adsorbent modules utilized in the process. The number of conduits employed in connection with the dual port rotary valve 18 is therefore twice the number of adsorbent modules in the apparatus which can vary from a low of about 8 to the maximum number which it is desired to employ. A typical maximum number of adsorbent chambers is 16 to 20. The closeness of approach to a continuous countercurrent system will increase as the number of adsorbent chambers is increased.

In a preferred embodiment of the invention the rotary valve 18 which is employed to maintain unidirectional flow through the adsorbent modules is provided with an outlet line 11 for the purpose of allowing the discharge of a process stream from the apparatus. In this embodiment of the invention, this process stream is collected at the point in the flow which is blocked by the rotary valve 18. This point is immediately upstream of the desorbent inlet to the adsorbent chambers. At this point the material flowing through the serially interconnected adsorbent modules has a high concentration of desorbent and this material may be collected for reuse as desorbent. Alternatively, and as shown on the Drawing, it may be discharged into the raffinate storage tank.

Figure 5:
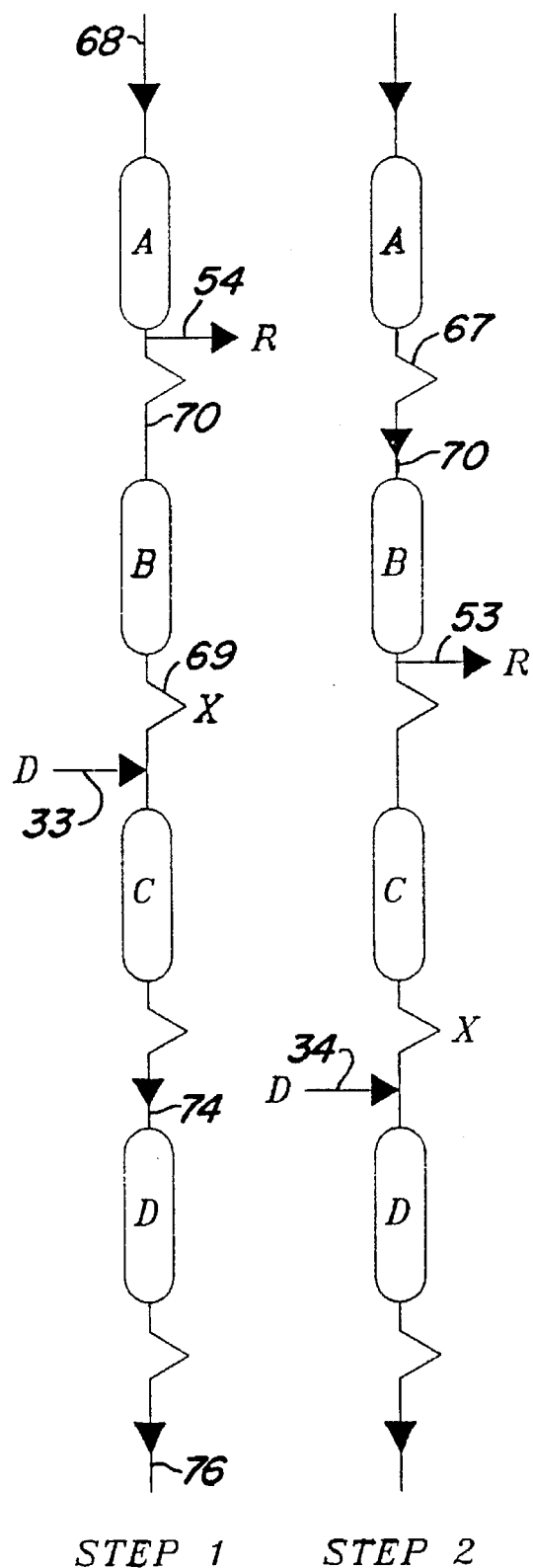
FIG. 5 illustrates the flows in one section of the apparatus during two arbitrary steps used in simulating countercurrent flow.

FIG. 5 is a simplified depiction of four adsorbent chambers labeled A through D to correspond to four chambers of the other figures. FIG. 5 is intended to further clarify the flow sequencing which occurs in the steps of the subject invention and to illustrate the concept of a "dead bed". The Figure has therefore been simplified by showing only the chamber interconnecting lines and those having a flow during the two steps illustrated in the FIG.

The notches pointed to the right represent the conduits which lead to and from the rotary valve 18 of FIG. 4. The "X" next to the notch between chambers B and C of step 1 and between chambers C and D of step 2 indicate the position of the blocked line in valve 18, which functions as a check valve to maintain unidirectional flow.

In step 1 the raffinate stream is leaving the bottom of chamber A via line 54 for passage into rotary valve 13. The blocked connection in valve 18 prevents flow continuing from line 69 into line 72 as represented by the "X" adjacent to the notch between chambers B and C. Desorbent flows into the top of chamber C via line 33, and there is no flow through chamber B. Chamber B is thus a "dead bed". This void volume of this chamber is filled with the desorbent at this point in the cycle and it is the desorbent in this chamber which may be recovered by passage into the desorbent tank 5 via optional line 11. If the desorbent is not recovered in this manner, it becomes intermixed with the raffinate stream in the next step in the cycle. The stream of line 11 may also be used as a control mechanism. If analysis of this stream indicates that it is not pure desorbent, then the flow rate of the desorbent stream is too low and should be increased.

Step 2 shows the flows in these same four chambers after the valves have indexed on step. At this time in the cycle, the raffinate stream is withdrawn from chamber B via line 53. The desorbent stream enters via line 34 and flows into chamber D. Chamber C is now the dead bed as flow is blocked upstream of the entrance of the desorbent stream.

It must be noted that the "dead bed" nomenclature can be misleading when the optional desorbent recycle stream is withdrawn for reuse or analysis. The withdrawal of this stream, which has a reduced flow rate compared to the main streams, does induce some flow through the dead bed chamber.

Referring again to FIG. 5, it may be observed that when the blockage "X" is provided by valve 18, then the volume in the "dead bed" can be withdrawn if desired through valve 18. This is the function of optional line 11 which allows the withdrawal of a small (low flow rate) stream of the desorbent originally present in the "dead bed" The withdrawal of this stream is optional. The desire to recover this desorbent for reuse increases with the size and length of operation of a specific apparatus. That is, as the total recoverable volume of desorbent increases this line becomes more desirable. Another factor relevant to the desirability of recovering this desorbent recycle stream is the cost and difficulty of recovering desorbent from the collected raffinate. The collected raffinate, and extract, will contain some desorbent and failure to withdraw the desorbent via line 11 increases the amount of desorbent in the total raffinate.

Still referring to FIG. 5, it may be observed that if there is no desire to collect the desorbent slip stream of line 11 for either recycle or analysis, then the "dead bed" could be eliminated. This may be done (during this one step in the cycle) by withdrawing the raffinate stream via line 53 while passing the desorbent stream into the adsorbent chamber flow path via line 33. At this time, the blockage "X" must be located between these two transfer conduits.

Another basic variation to the invention would be the substitution of a number of electrically activated, e.g., solenoid, valves for the blockage provided in the rotary valve 18 which functions as a movable check valve to ensure unidirectional flow in the apparatus. This valve also provides the serial interconnection necessary to have all of the adsorbent chambers in communication with each other. In this variation some form of solenoid or check valve will be located between each adsorbent chamber to provide the blockage of the interconnecting lines. It may be further noted that if this variation is combined with the previously described variation which eliminates the "dead bed" adsorbent chamber, then the interconnecting rotary valve 18 can be eliminated and the interconnection between the chambers can be made via conduits.

The Drawing is only intended to explain the invention by illustrating one preferred embodiment. Many variations departing from the apparatus depicted in the drawing are possible. For instance, it will be readily recognized by those skilled in the art that the flow of the main process streams, that is the feed, desorbent, extract and raffinate streams, can be controlled in a number of different ways. The use of pumps to set the rate of three streams as shown in the Drawing is only one example. Another example would be the use of flow control valves on the outlet streams or on the inlet streams or on some combination of these stream. It is also to be noted that the practice of the invention can vary from that shown on the Drawing in that the three pumps could be located on a different grouping of valves. That is the pump shown on the extract outlet line 15 could instead be located on the raffinate outlet line 12.

There are a number of factors which remain constant during use of the invention such as a chosen mechanical configuration and the sequence in which the streams flow to and from the chambers. This sequence, in a downstream direction, is desorbent, extract, feed and raffinate. The step time will normally remain constant during a run but may be varied to adjust performance. The real variables are the number of beds assigned to each zone, e.g., adsorption or desorption, the step time and the flow rate of three of the process streams. The flow rates of the feed, desorbent and raffinate streams are preferably controlled and hence variable. The flow rate of the raffinate may then vary but is really dependent on control of the other three streams.

The subject apparatus can be constructed from commercially available components. The adsorbent modules or chambers are preferably standard HPLC tubes. All of the chambers will contain the same adsorbent. The adsorbent chambers may be purchased filled with the adsorbent or the adsorbent may be loaded separately. Examples of suitable adsorbent material include the cross-linked organic resins, natural or synthetic zeolites including zeolites X, Y, L, ZSM, Beta and omega, silica-alumina, the various adsorptive aluminas, pillared and mesoporous materials including pillared clays, and nonzeolitic molecular sieves (NZMS), such as silico alumino-phosphates and aluminophosphates, and chiral stationary phases. Suitable rotary valves are available from Valco Instrument Co. Inc. of Houston, Tex. The conduits and connectors may be of standard design for HPLC instruments.

Despite the fact that the subject apparatus utilizes a large number of conduits, the apparatus is not significantly troubled by backmixing or intermixing of streams of different composition within the internal volume of the conduits. The basic reason for this is that all of the conduits leading to the four rotary valves for the feed, desorbent, extract and raffinate streams are dedicated to carrying just these streams.

The rotary valves can be mechanically linked such that they are all indexed simultaneously by a single drive mechanism. However, it is preferred that a separate driver is provided for each rotary valve. This allows the relative position of the feed and withdrawal points to be adjusted as desired to thereby adjust the number of adsorbent chambers in the different zones, e.g., adsorption used in the process.

A preferred embodiment of the subject invention can accordingly be characterized as an apparatus for performing a continuous high pressure liquid chromatographic separation which comprises a plurality of adsorbent chambers, with each chamber having an inlet and an outlet at opposite ends of the adsorbent chamber and being loaded with a quantity of a solid adsorbent; a first rotary valve means being connected via a first set of conduits to the inlet and outlet of each adsorbent chamber, with the first rotary valve means providing a serial interconnection of the adsorbent chambers such that liquid can flow from one adsorbent chamber to the next adsorbent chamber while also providing a means to prevent the flow of liquid through one of a selected pair of conduits linking the first rotary valve to one of the sequential chambers; second and third rotary valve means each having outlets equal in number to the plurality of adsorbent chambers, with each outlet being connected via a single conduit to the inlet of one adsorbent chamber; fourth and fifth rotary valve means each having outlets equal in number to the plurality of adsorbent chambers, with each outlet being connected via a single conduit to the outlet of one adsorbent chamber; flow control devices adapted to regulate the rate of flow of fluid through three rotary valves chosen from the second, third, fourth and fifth rotary valves; fluid storage devices for a feed mixture and a desorbent compound operatively connected to the second and third rotary valves; means for charging a feed stream and a desorbent stream to different adsorbent chambers via said second and third rotary valves; and, fluid storage devices for an extract stream and a raffinate stream operatively connected to the fourth and fifth rotary valve means for collecting an extract steam and a raffinate stream delivered to said fourth and fifth rotary valve means via conduits connected to the outlet of the adsorbent chambers. This apparatus preferably includes a dedicated outlet located on said first rotary valve means and connected to a conduit leading to the desorbent compound fluid storage device. This dedicated outlet is in communication with the first set of conduits to allow the flow of the previously described desorbent slip or recycle stream from the "dead bed" adsorbent chamber located upstream of the desorbent injection point.

Operating conditions suitable for the reaction zone of the subject process include a temperature of about 0 to 300 degrees C., preferably 20 to 100 degrees C. It is generally preferred that the process is operated with a positive pressure in the general range of about 3500 to 25000 kPa. Representative flow rates for a small (exploratory separation) scale unit are 0.1–2.0 ml/min for the feed and 2–20 ml/min for the desorbent. Larger units would have quite a bit larger flow rates, but the total amount of dry product recovered from the extract is expected to remain under 1-10 kg/day.

While the subject invention is envisioned as being primarily suitable for liquid phase flow, it is believed the operating principles and apparatus could be applied to vapor phase flow.

As previously mentioned chromatographic separations can be applied to a wide range of chemical compounds. Rather unusual chemicals such as chiral pharmaceutical intermediates are just one example. Nonchiral alkyl aromatics, halogenated aromatic compounds or aromatic compounds containing hetero atoms may also be separated using the subject invention. The aromatics may have from one to four or more rings. Oxygenated aromatics such as ethers, esters and alcohols, carbohydrates such as saccharides, organic acids, proteins and amino acids are other classes of suitable feed compounds. The subject process can be used for the separation of one specific compound from a mixture or for the separation of a class of compounds from one or more other classes of compounds.

The subject invention can also be characterized as a process for separating a mixture of two or more chemical compounds by liquid chromatography which comprises the steps of passing a feed stream comprising a mixture of at least a first and a second chemical compounds into a first rotary valve which selectively directs the flow of the feed stream into a first adsorbent chamber, of a plurality of serially interconnected adsorbent chambers, via a first conduit connecting the first rotary valve and the first adsorbent chamber; passing a desorbent stream comprising a desorbent compound into a second rotary valve which selectively directs the flow of the desorbent stream into a second adsorbent chamber of said plurality via a second conduit which connects the second adsorbent chamber and the second rotary valve; withdrawing an extract stream comprising the first chemical compound from a third adsorbent chamber of said plurality via a third conduit which connects the third adsorbent chamber to a third rotary valve; withdrawing a raffinate stream comprising the second chemical compound from a fourth adsorbent chamber of said plurality via a fourth conduit which connects the fourth adsorbent chamber to a fourth rotary valve; advancing liquid process streams in a unidirectional manner through at least all but one of the adsorbent chambers of said plurality via a fifth rotary valve which is connected via conduits to the inlet and outlet ends of each of the adsorbent chambers of said plurality, with the fifth rotary valve allowing free passage of the process streams between all of the adsorbent chambers except between the second adsorbent chamber, which is receiving the desorbent stream, and the immediately upstream adsorbent chamber; and, indexing the position of each of the rotary valves in unison to change the conduits carrying the feed, desorbent extract and raffinate streams and to thereby incrementally change the chambers receiving or discharging these streams such that the movement of adsorbent within the adsorbent chambers is simulated.

What is claimed:

1. A process for separating a mixture of two or more chemical compounds by liquid chromatography which comprises the steps:

(a) passing a feed stream comprising a mixture of at least a first chemical compound and a second chemical compound into a first rotary valve which selectively directs the flow of the feed stream into a first adsorbent chamber, of a plurality of serially interconnected adsorbent chambers, via a first conduit connecting the first rotary valve and the first adsorbent chamber;

(b) passing a desorbent stream comprising a desorbent compound into a second rotary valve which selectively directs the flow of the desorbent stream into a second adsorbent chamber of said plurality via a second conduit which connects the second adsorbent chamber and the second rotary valve;

(c) withdrawing an extract stream comprising the first chemical compound from a third adsorbent chamber of said plurality via a third conduit which connects the third adsorbent chamber to a third rotary valve;

(d) withdrawing a raffinate stream comprising the second chemical compound from a fourth adsorbent chamber of said plurality via a fourth conduit which connects the fourth adsorbent chamber to a fourth rotary valve;

(e) advancing liquid process streams in a unidirectional manner through at least all but one of the adsorbent chambers of said plurality via a fifth rotary valve which is connected via conduits to the inlet and outlet ends of each of the adsorbent chambers of said plurality, with the fifth rotary valve allowing free passage of the process streams between all of the adsorbent chambers except between the second adsorbent chamber, which is receiving the desorbent stream, and the immediately upstream adsorbent chamber; and, (f) indexing the position of each of the rotary valves in unison to change the conduits carrying the feed, desorbent extract and raffinate streams and to thereby incrementally change the chambers receiving or discharging these streams such that the movement of adsorbent within the adsorbent chambers is simulated.

2. The process of claim 1 further comprising the step of withdrawing a recycle stream comprising the desorbent compound from the fifth rotary valve means, with the recycle stream being formed from liquid withdrawn from the adsorbent chamber immediately upstream of the second adsorbent chamber.

3. The process of claim 1 further comprising the step of removing a sample stream from a dedicated outlet on a rotary valve means.

4. The process of claim 3 further limited in that the sample stream is withdrawn from the fifth rotary valve means.

* * * * *